(12) United States Patent
Christiaens et al.

(10) Patent No.: US 8,224,875 B1
(45) Date of Patent: *Jul. 17, 2012

(54) SYSTEMS AND METHODS FOR REMOVING UNREFERENCED DATA SEGMENTS FROM DEDUPLICATED DATA SYSTEMS

(75) Inventors: Mark Christiaens, Aalter (BE); Fanglu Guo, Los Angeles, CA (US); Weibao Wu, Vandanis Heights, MN (US)

(73) Assignee: Symantec Corporation, Mountain View, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 12/652,333

(22) Filed: Jan. 5, 2010

(51) Int. Cl.
  *G06F 17/30* (2006.01)
(52) U.S. Cl. .................. 707/813; 707/814; 707/816
(58) Field of Classification Search .......... 707/813–817; 711/129
  See application file for complete search history.

(56) References Cited

U.S. PATENT DOCUMENTS

| | | | |
|---|---|---|---|
| 5,577,246 A * | 11/1996 | Priddy et al. .................. | 1/1 |
| 5,990,810 A * | 11/1999 | Williams ................... | 341/51 |
| 6,304,880 B1 * | 10/2001 | Kishi ............................. | 1/1 |
| 6,571,260 B1 * | 5/2003 | Morris ........................... | 1/1 |
| 8,108,446 B1 * | 1/2012 | Christiaens ................ | 707/816 |
| 2003/0033320 A1 * | 2/2003 | Houldsworth ............ | 707/103 R |
| 2003/0177327 A1 * | 9/2003 | Baentsch et al. ............. | 711/170 |
| 2005/0132374 A1 * | 6/2005 | Flood et al. ................... | 718/100 |
| 2006/0173939 A1 * | 8/2006 | Yin et al. ..................... | 707/206 |
| 2008/0005201 A1 | 1/2008 | Ting et al. | |
| 2009/0259701 A1 | 10/2009 | Wideman et al. | |
| 2010/0211753 A1 * | 8/2010 | Ylonen ......................... | 711/165 |
| 2010/0235377 A1 * | 9/2010 | Kuryata et al. ............... | 707/769 |

OTHER PUBLICATIONS

Sun Developer Network (SDN); Bug Database Community, Bug ID 6283488; http://bugs.sun.com/bugdatabase/view_bug.do?bug_id=6283488; Taken from site on Dec. 10, 2009.
Metadecks.org: AUBE—Sweep—Links; http://www.metadecks.org/software/sweep/news.html; Taken from site on Dec. 2, 2009.
3D2F.com Software Directory; http://3d2f.com/tags/excel/remove/duplicate/data/; Taken from site on Dec. 2, 2009.
Jonathan Liss; Seeking Alpha; EMC to Launch Data Deduplication for VMware; VMware Shares Surge; http://seekingalpha.com/article/46664-emc-to-launch-data-deduplication-for-vmware-vmware-shares-surge; Taken from site on Dec. 2, 2009.
Nerdnotes.org; CakePHP Email Component; http://nerdnotes.org/; Oct. 20, 2009.
Fanglu Guo et al.; Systems and Methods for Removing Unreferenced Data Segments From Deduplicated Data Systems; Non-Final Office Action in U.S. Appl. No. 12/652,300 on Oct. 26, 2011.

(Continued)

*Primary Examiner* — Hanh Thai
(74) *Attorney, Agent, or Firm* — Advantedge Law Group

(57) ABSTRACT

A computer-implemented method for removing unreferenced data segments from deduplicated data systems may include: 1) identifying a deduplicated data system that contains a plurality of data segments, 2) identifying a plurality of containers within the deduplicated data system, with each container containing a subset of the data segments within the deduplicated data system, 3) identifying at least one container within the plurality of containers that is likely to include a large proportion of data segments that are not referenced by data objects within the deduplicated data system, and then, for each identified container, 4) searching for unreferenced data segments within the identified container and 5) removing the unreferenced data segments from the identified container. Various other methods, systems, and computer-readable media are also disclosed.

20 Claims, 9 Drawing Sheets

OTHER PUBLICATIONS

Fanglu Guo et al.;Systems and Methods for Removing Unreferenced Data Segments From Deduplicated Data Systems; International Search Report and Written Opinion received in PCT Application No. PCT/US2010/062183 on Mar. 31, 2011.

* cited by examiner

SYSTEMS AND METHODS FOR REMOVING UNREFERENCED DATA SEGMENTS FROM DEDUPLICATED DATA SYSTEMS

BACKGROUND

Deduplicated data systems are often able to reduce the amount of space required to store files by recognizing redundant data patterns. For example, a deduplicated data system may reduce the amount of space required to store similar files by dividing the files into data segments and storing only unique data segments. In this example, each deduplicated file may simply consist of a list of data segments that make up the file.

While conventional deduplicated data systems may reduce the space required to store files, the mechanisms used by such conventional systems to manage deduplicated data may present unwanted limitations. For example, since more than one file may reference any given data segment, the data segments that make up a file cannot simply all be removed when the file is deleted. In order to safely delete data segments, a deduplicated data system must distinguish between referenced and unreferenced data segments.

In some cases, conventional deduplicated data systems may use bilateral referencing systems in order to ensure that data segments are not prematurely removed. For example, each file in a conventional deduplicated data system may include a list of data segments that make up the file. Likewise, each data segment within the deduplicated data system may maintain a list that identifies each file within the system that references the data segment. The deduplicated data system may use the lists maintained by both the files and the data segments to identify unreferenced data segments (i.e., data segments that are no longer referenced by any of the files in the deduplicated data system) that may be removed from the system.

Unfortunately, the bilateral referencing systems used by many conventional deduplicated data systems suffer from a number of deficiencies. For example, when a file in a conventional deduplicated data system is updated, the system may need to update both the referential list maintained by the file and the referential list maintained by each data segment referenced by the file. The process of creating and updating two referential lists may be both time consuming and resource intensive.

In other examples, conventional deduplicated data systems may use mark-and-sweep systems in order to ensure that data segments are not prematurely removed. For example, a deduplicated data system may check each data segment to see if that data segment is referenced by any file in the deduplicated data system. In this example, if a mark-and-sweep system finds a file that includes the data segment, the mark-and-sweep system may mark the data segment as referenced. The mark-and-sweep system may then sweep the deduplicated data system for unmarked data segments and delete the unmarked data segments. Unfortunately, a brute force approach of checking each data segment may also be time consuming and resource intensive. Accordingly, the instant disclosure identifies a need for efficiently marking and sweeping unreferenced data segments in deduplicated data systems.

SUMMARY

As will be described in greater detail below, the instant disclosure generally relates to systems and methods for efficiently removing unreferenced data segments from deduplicated data systems by focusing mark-and-sweep operations on groups of data segments that are likely to include large proportions of unreferenced data segments. In one example, one or more of the various systems described herein may accomplish this task by: 1) identifying a deduplicated data system that contains a plurality of data segments, 2) identifying a plurality of containers within the deduplicated data system that contain a subset of the data segments within the deduplicated data system, 3) identifying at least one container within the plurality of containers that is likely to include a large proportion of data segments that are not referenced by data objects within the deduplicated data system, and, for each identified container, 4) searching for unreferenced data segments within the identified container and then 5) removing the unreferenced data segments from the identified container.

In some examples, the subset of data segments contained within each of the plurality of containers may include interrelated data segments (e.g., data segments likely to be dereferenced at or near the same time). Due to this interrelation, some containers may include significantly more unreferenced data segments than others.

In some embodiments, identifying at least one container within the plurality of containers that is likely to include a large proportion of unreferenced data segments may entail sampling data segments from the containers. A method for accomplishing this task may include: 1) identifying a sample of data segments within the plurality of data segments, 2) identifying unreferenced data segments within the sample of data segments, and, for each unreferenced data segment, 3) identifying a container that contains the unreferenced data segment. In some examples, identifying the sample may include randomly selecting the sample. In certain embodiments, identifying the sample may include selecting the sample from an index of data segments within the deduplicated data system.

In some contexts, the data in the deduplicated data system may be divided into data selections (e.g., backup instances). Each data selection may reference some of the data objects in the deduplicated data system. In these contexts, identifying data segments within the sample of data segments that are not referenced by data objects within the deduplicated data system may include identifying a plurality of data selections within the deduplicated data system and creating a list of data objects that are referenced by at least one data selection within the plurality of data selections. In some examples, creating the list of referenced data objects may include: 1) identifying at least one active data selection within the plurality of data selections that has had a relatively large number of data objects removed since the last time the active data selection was analyzed, 2) analyzing the active data selection to identify each data object referenced by the active data selection, and then 3) including each data object referenced by the active data selection in the list of referenced data objects.

In some examples, creating the list of referenced data objects also may include: 1) identifying at least one inactive data selection within the plurality of data selections that has had relatively few data objects removed since the last time the inactive data selection was analyzed, 2) including each data object marked as referenced by the inactive data selection in the list of referenced data objects, and 3) including each data object recently added to the inactive data selection in the list of referenced data objects.

In certain contexts, a data index may map data segments in the deduplicated data system to their respective containers. In these contexts, identifying (for each unreferenced data segment) a container that contains the unreferenced data segment may include identifying a fingerprint of the unreferenced data segment and querying a data index of the deduplicated data system using the fingerprint to locate the container of the unreferenced data segment.

In some examples, a container may include a large proportion of unreferenced data segments if it includes a proportion of unreferenced data segments exceeding a predetermined threshold. In other examples, a container may include a large proportion of unreferenced data segments if it includes a larger proportion of unreferenced data segments than other containers.

The search for unreferenced data segments within the identified container (for each identified container) may operate in a variety of ways. In some examples, searching for unreferenced data segments within the identified container may entail exhaustively searching for unreferenced data segments within the identified container. In other embodiments, the search may include marking referenced data segments within the identified container as referenced and then identifying unmarked data segments.

In some embodiments, the method may also include, for each container not identified as likely to include a large proportion of unreferenced data segments: 1) identifying a list of data segments in the container previously marked as referenced, 2) identifying a set of data segments recently added to the container, and then 3) adding the set of data segments recently added to the container to the list of marked data segments in the container.

As will be explained below, by focusing mark-and-sweep procedures on containers that are more likely to include a proportionally large number of unreferenced data segments, the systems and methods described herein may efficiently delete unreferenced data segments by reducing the amount of computing resources consumed per data-segment deletion. Moreover, in some cases the systems and methods described herein may also improve the analysis of data selections in the course of mark-and-sweep procedures by only fully analyzing data selections that have had a large number of data objects removed.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
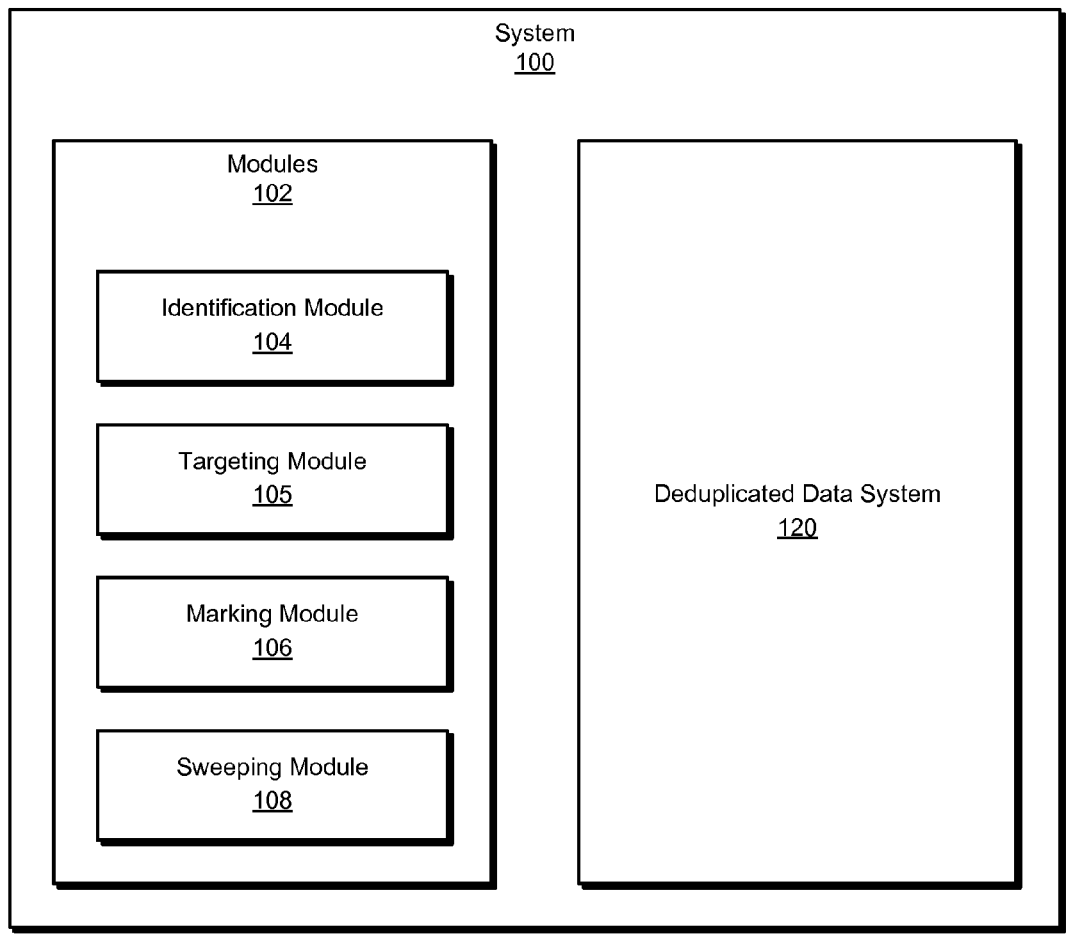
FIG. 1 is a block diagram of an exemplary system for removing unreferenced data segments from deduplicated data systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for efficiently removing unreferenced data segments from deduplicated data systems. The phrase "deduplicated data system," as used herein, generally refers to storage systems that reduce redundant data by only storing a single instance of data (e.g., a data segment), potentially referencing each data instance multiple times. Examples of deduplicated data systems may include SYMANTEC's NETBACKUP PUREDISK. As will be described in greater detail below, a single instance of data may be referenced by a single data object (e.g., a file) or a plurality of data objects within the deduplicated data system.

Figure 2:
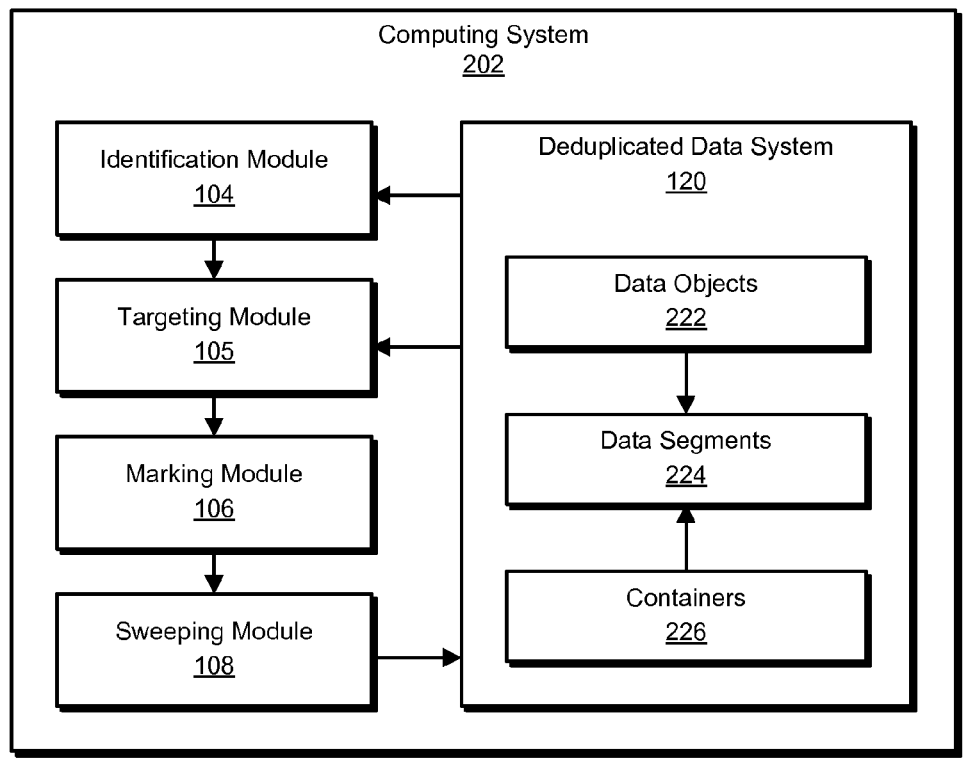
FIG. 2 is a block diagram of an exemplary system for removing unreferenced data segments from deduplicated data systems.

The following will provide, with reference to FIGS. 1-2, detailed descriptions of exemplary systems for removing unreferenced data segments from deduplicated data systems. Detailed descriptions of corresponding computer-implemented methods will also be provided in connection with FIGS. 3-7. In addition, detailed descriptions of an exemplary computing system and network architecture capable of implementing one or more of the embodiments described herein will be provided in connection with FIGS. 8 and 9, respectively.

FIG. 1 is a block diagram of an exemplary system 100 for removing unreferenced data segments from deduplicated data systems. As illustrated in this figure, exemplary system 100 may include one or more modules 102 for performing one or more tasks. For example, and as will be explained in greater detail below, exemplary system 100 may include an identification module 104 programmed to identify a deduplicated data system that contains a plurality of data segments. Identification module 104 may also be programmed to identify a plurality of containers within the deduplicated data system, each of which may contain a subset of the data segments within the deduplicated data system. Exemplary system 100 may also include a targeting module 105 programmed to identify at least one container within the plurality of containers that is likely to include a large proportion of data segments that are not referenced by data objects within the deduplicated data system.

Exemplary system 100 may also include a marking module 106 programmed to search for unreferenced data segments within each identified container (e.g., by marking referenced data segments within each identified container and locating unmarked data segments). In addition, and as will be described in greater detail below, exemplary system 100 may include a sweeping module 108 programmed to remove unreferenced data segments from each identified container. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as computing system 202 in FIG. 2, computing system 810 in FIG. 8, and/or portions of exemplary network architecture 900 in FIG. 9. One or more of modules 102 in FIG. 1 may also represent all or portions of one or more special-purpose computers configured to perform one or more tasks.

As illustrated in FIG. 1, exemplary system 100 may also include a deduplicated data system 120. Deduplicated data system 120 may represent portions of a single storage system or computing device or a plurality of storage systems or computing devices. For example, deduplicated data system 120 may represent a portion of computing system 202 in FIG. 2, computing system 810 in FIG. 8, and/or portions of exemplary network architecture 900 in FIG. 9. Alternatively, deduplicated data system 120 in FIG. 1 may represent one or more physically separate devices capable of being accessed by a computing device, such as computing system 810 in FIG. 8 and/or portions of exemplary network architecture 900 in FIG. 9.

Exemplary system 100 may be deployed in a variety of ways. For example, all or a portion of exemplary system 100 may represent portions of an exemplary system 200 in FIG. 2. As shown in FIG. 2, exemplary system 200 may include a computing system 202 including deduplicated data system 120 from FIG. 1. In one embodiment, and as will be described in greater detail below, modules 102 from FIG. 1 may program computing system 202 to: 1) identify a deduplicated data system (such as deduplicated data system 120) that contains a plurality of data segments (such as data segments 224), 2) identify a plurality of containers within the deduplicated data system (such as containers 226), with each container containing a subset of the data segments within the deduplicated data system, 3) identify at least one container within the plurality of containers that is likely to include a large proportion of data segments that are not referenced by data objects within the deduplicated data system (such as data objects 222), and, for each identified container, 4) search for unreferenced data segments within the identified container and then 5) remove the unreferenced data segments from the identified container (e.g., delete the unreferenced data segments within the identified container).

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 810 in FIG. 8, or any other suitable computing device.

Figure 3:
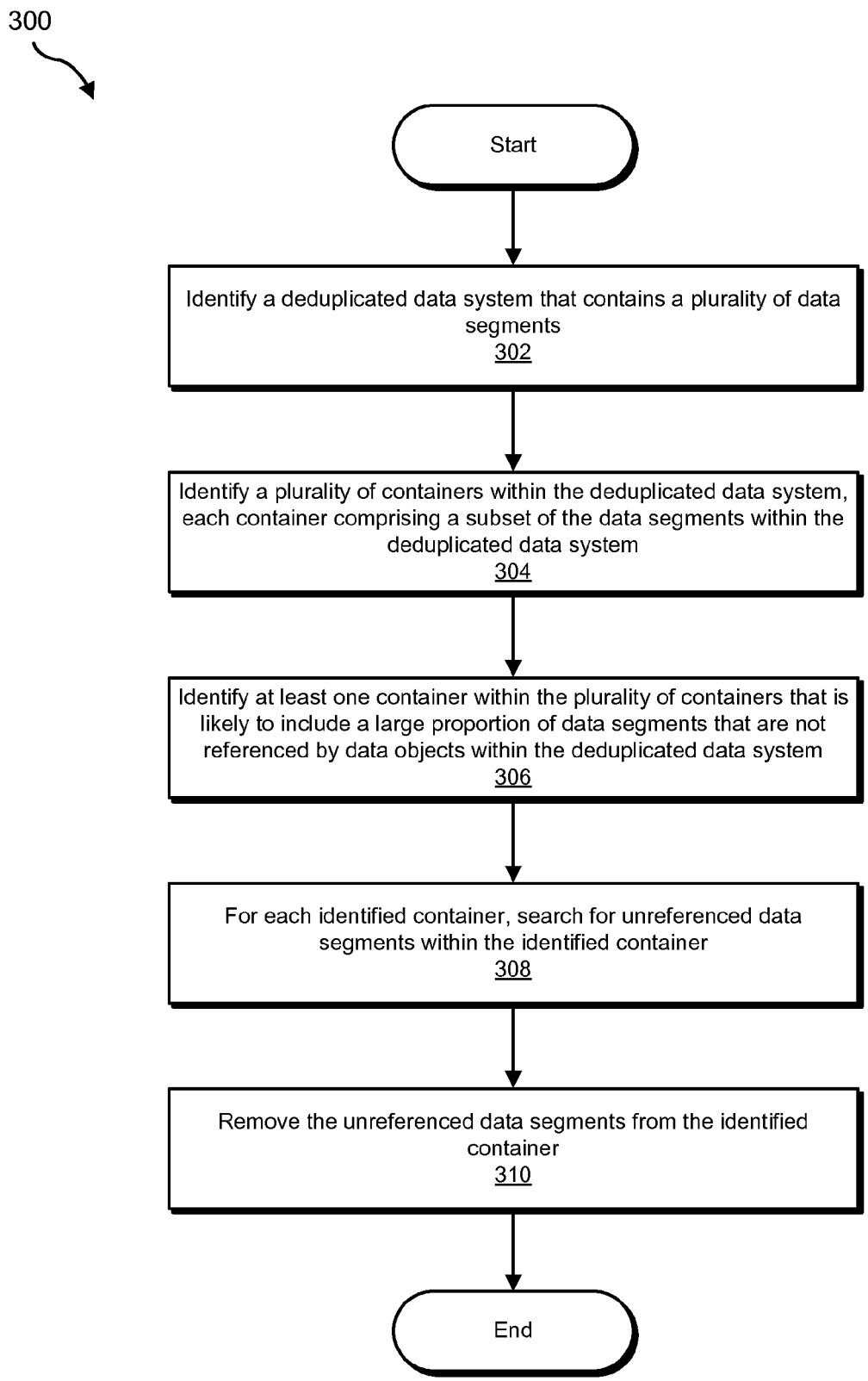
FIG. 3 is a flow diagram of an exemplary method for removing unreferenced data segments from deduplicated data systems.

FIG. 3 is a flow diagram of an exemplary computer-implemented method 300 for removing unreferenced data segments from deduplicated data systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, and/or system 800 in FIG. 8.

As illustrated in FIG. 3, at step 302 one or more of the systems described herein may identify a deduplicated data system that contains a plurality of data segments. For example, at step 302 identification module 104 from FIG. 1 may, as part of computing system 202 in FIG. 2, identify deduplicated data system 120. As used herein, the term "data segment" may refer to a segment of data, a block of data, or any other suitable unit of data used for data deduplication.

Identification module 104 may perform step 302 in any suitable manner. In one example, identification module 104 may identify the deduplicated data system by reading a configuration file associated with the deduplicated data system. Additionally or alternatively, identification module 104 may identify the deduplicated data system by identifying (e.g., intercepting, receiving, or retrieving) a request to remove unreferenced data segments from the deduplicated data system. In some contexts, identification module 104 may be an extension and/or a component of the deduplicated data system, and may implicitly identify the deduplicated data system simply through the context in which it is executing.

At step 304, one or more of the systems described herein may identify a plurality of containers within the deduplicated data system. In some examples, each container may include a subset of the data segments within the deduplicated data system. For example, at step 304 identification module 104 in FIG. 1 may, as part of computing system 202 in FIG. 2, identify containers 226 within deduplicated data system 120. As used herein, the term "container" may refer to any data structure, storage system, and/or location that stores, contains, includes, and/or points to a subset of data segments.

In some contexts, the subset of data segments contained within each given container in the plurality of containers may be interrelated. For example, the data segments of the deduplicated data system may be non-randomly distributed among the containers. In some contexts, this non-random distribution may arise because the containers may contain or tend to contain data segments from interrelated data objects. For example, if the deduplicated data system is part of a backup system, the deduplicated data system may store (or attempt to store) the data segments of all files in a given backup in the same container or set of containers. Since the files in a given backup may tend to be removed together (e.g., if the backup is deleted), many of the data segments of those files may become unreferenced at the same time. As will be described in greater detail below, the container or set of containers used for that backup may then have a disproportionately large number of unreferenced data segments, making that container or set of containers a good target for a focused mark-and-sweep operation. While the backup data deduplication system described in the example above may be suitable for the methods and systems described herein, any deduplicated data system that may, for any reason, lead to an uneven distribution of unreferenced data segments across containers may also be suitable.

Identification module 104 may perform step 304 in any suitable manner. For example, identification module 104 may identify the plurality of containers by reading a configuration file associated with the containers (e.g., a configuration file of the deduplicated data system identifying the containers). Additionally or alternatively, identification module 104 may identify the plurality of containers by receiving and/or intercepting a message identifying the containers.

Returning to FIG. 3, at step 306 one or more of the systems described herein may identify at least one container (e.g., each container) within the plurality of containers that is likely to include a large proportion of data segments that are not referenced by data objects within the deduplicated data system. For example, targeting module 105 in FIG. 1 may, as part of computing system 202 in FIG. 2, identify at least one container within containers 226 that is likely to include a large proportion of data segments that are not referenced by data objects 222. As used herein, the term "data object" may refer to any collection of data suitable for deduplication, such as a file.

Figure 4:
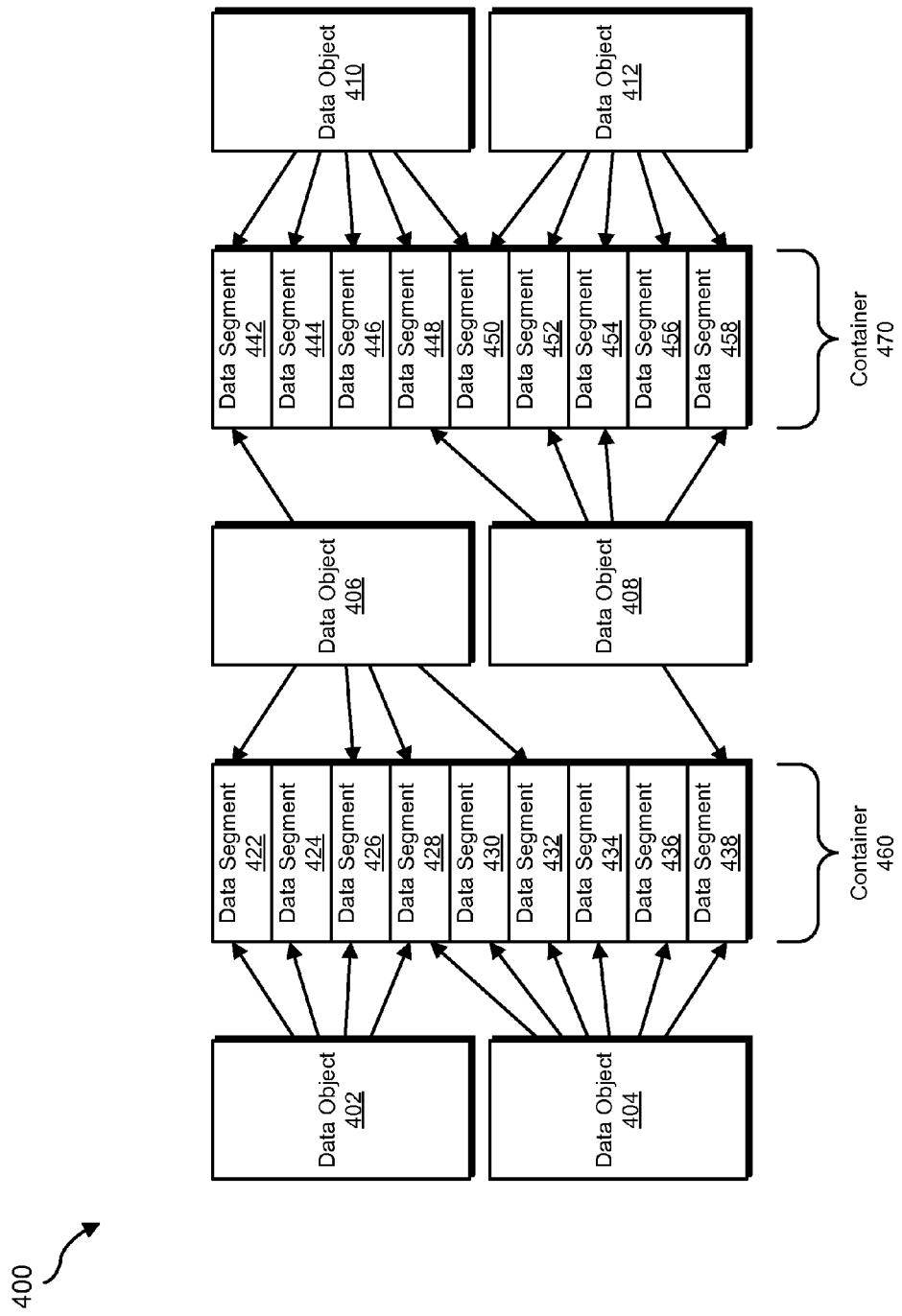
FIG. 4 is a block diagram of an exemplary deduplicated data system.

By way of example and to further illustrate the description of the steps in FIG. 3, FIG. 4 shows an exemplary deduplicated data system 400. As illustrated in FIG. 4, exemplary deduplicated data system 400 may include data objects 402-412. Each of these data objects may include references to data segments (e.g., some of data segments 422-458). For example, data object 402 may include references to data segments 422, 424, 426, and 428. Data segments 422-458 may be organized into, stored in, or allocated to containers (e.g., containers 460 and 470). For example, data segments 422-438 may be stored in container 460 and data segments 442-458 may be stored in container 470.

Some data segments may be referenced by only one data object (such as data segment 424, which is only referenced by data object 402). Other data segments may be referenced by more than one data object (such as data segment 428, which is referenced by data objects 402, 404, and 406). For example, in the example illustrated in FIG. 5 (which is an illustration of exemplary deduplicated data system 400 in a different state), data objects 402 and 404 may have been deleted. This operation may leave some, but not all, of the data segments included by data objects 402 and 404 unreferenced. For example, data object 402 may have originally referenced data segments 422, 424, 426, and 428. After removing data object 402, data segments 422, 426, and 428 may still be referenced by at least one data object (in this case, data object 406), while data segment 424 may not be referenced by any data object and should therefore be deleted to recover storage space on the deduplicated data system.

Returning to step 306 of FIG. 3, targeting module 105 may identify one or more containers that are likely to include a large proportion of data segments in a variety of ways. In one example, targeting module 105 may keep a tally for each container indicating the number of times that a data object that referenced a data segment within the container has been deleted. In this example, a high tally may indicate a likelihood of a large number of unreferenced data segments.

In another example, targeting module 105 may: 1) sample data segments from the containers, 2) analyze the sample, and then 3) extrapolate information about the container based on the sample. For example, targeting module 105 may identify a sample of data segments within the plurality of data segments, determine which data segments in the sample are not referenced by data objects within the deduplicated data system, and then identify a container containing each unreferenced data segment in the sample. In this example, targeting module 105 may then create a frequency table or a similar data structure to compare the relative incidence of unreferenced data segments within the sample across containers. A large proportion of unreferenced data segments in the sample for a given container may indicate a large proportion of unreferenced data segments within the container.

Targeting module 105 may identify the sample of data segments in the above example in a number of ways. In one example, targeting module 105 may identify the sample of data segments by randomly selecting the sample of data segments. For example, targeting module 105 may use a pseudorandom number generator to generate a series of numbers that map to data segments in the deduplicated data system. In some examples, targeting module 105 may guarantee that an equal and/or proportionate number of data segments are sampled from each container.

Targeting module 105 may select the sample of data segments from a number of sources. For example, targeting module 105 may select the sample of data segments from containers, from data objects, and/or any other data structure that references the data segments. In one example, targeting module 105 may select the sample of data segments from an index of data segments within the deduplicated data system. This index of data segments may include any data structure that indexes data segments and/or data objects containing data segments. In some examples, this index of data segments may include fingerprints (e.g., unique identifiers) of each data segment in the deduplicated data system. In some embodiments, the index of data segments may provide indexing for the entire deduplicated data system. In addition, the index of data segments may include several indexes and/or data structures that provide indexing for the deduplicated data system.

Figure 5:
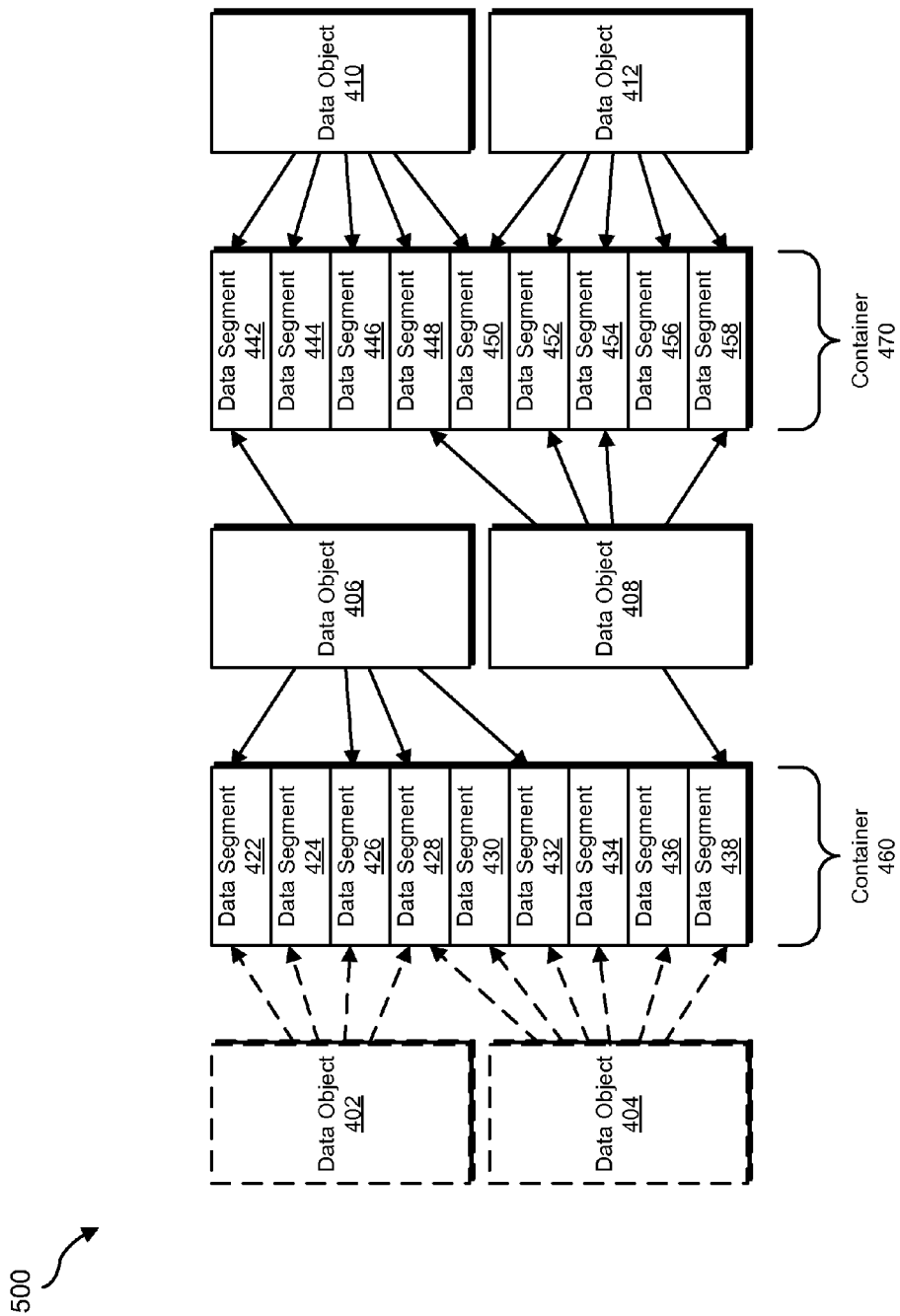
FIG. 5 is a block diagram of an exemplary deduplicated data system.
Figure 6:
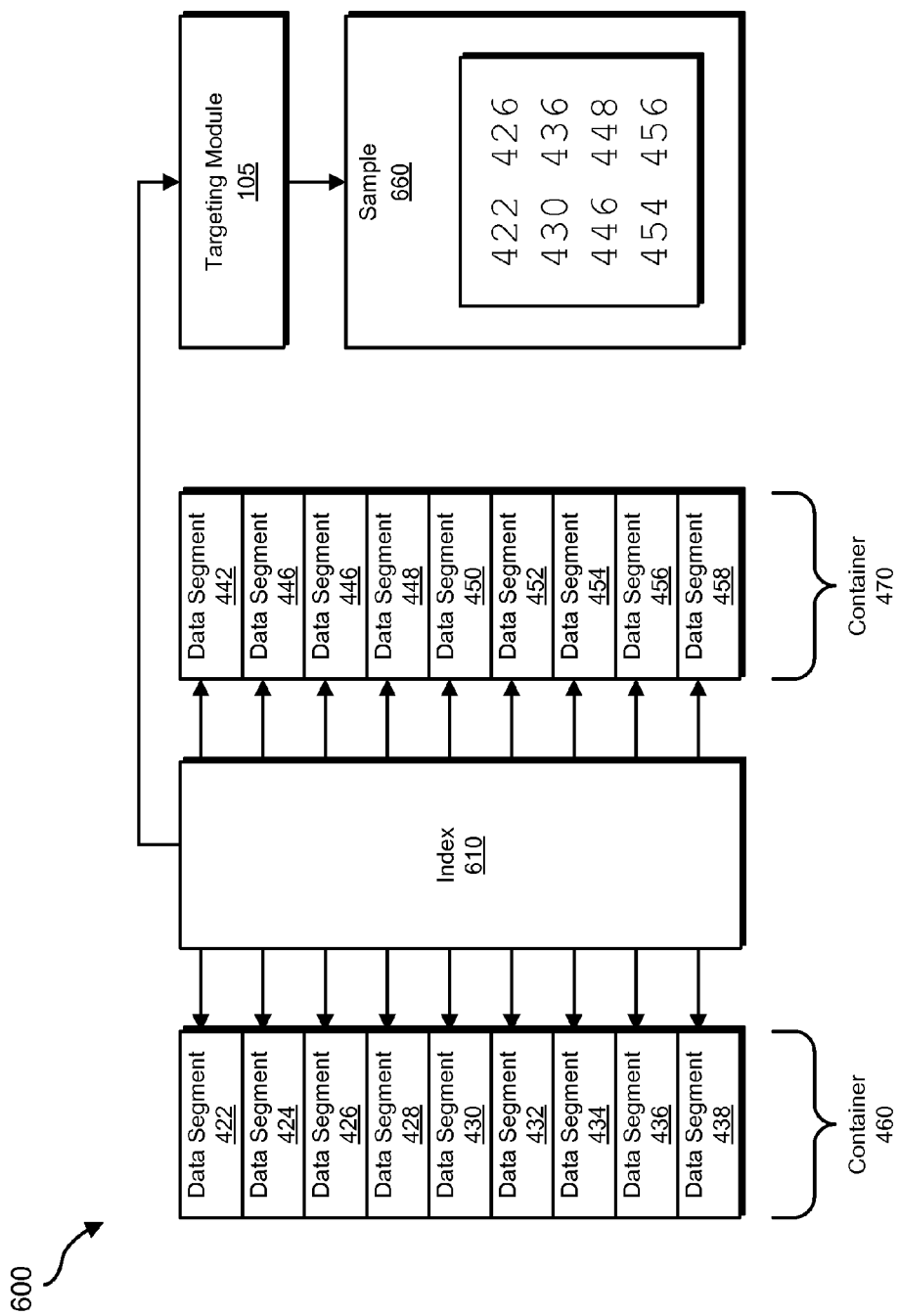
FIG. 6 is a block diagram of an exemplary system for removing unreferenced data segments from deduplicated data systems.

FIG. 6 is a block diagram illustrating an exemplary sampling of an exemplary index 610 within an exemplary deduplicated data system 600. As illustrated in FIG. 6, index 610 may index data segments 422-458 (e.g., from FIGS. 4-5). Targeting module 105 may randomly sample fingerprints of data segments from index 610, creating a sample 660. In this example, sample 660 may include fingerprints corresponding to data segments 422, 426, 430, 436, 446, 448, 454, and 456.

Returning to step 306 of FIG. 3, as previously mentioned targeting module 105 may identify data segments within the sample of data segments that are not referenced by data objects within the deduplicated data system. In the example illustrated in FIG. 6 and described above, targeting module 105 may identify data segments within sample 660 that are not referenced by data objects (e.g., data objects 406-412 of FIG. 5) within the deduplicated data system. As illustrated in FIG. 5, after the deletion of data objects 402 and 404, two of the data segments included in sample 660 (data segments 430 and 436) may be left unreferenced.

Targeting module 105 may identify data segments within the sample of data segments that are not referenced by data objects within the deduplicated data system in a variety of contexts. In some contexts, the deduplicated data system may include data selections. As used herein, the term "data selection" may refer to any selection, collection, and/or grouping of data objects within the deduplicated data system. For example, a data selection may refer to a backup (e.g., a collection of backed up data objects). In this example, a data selection may include metadata associated with data objects that are backed up, fingerprints of the backed up files, and/or references to data objects.

Figure 7:
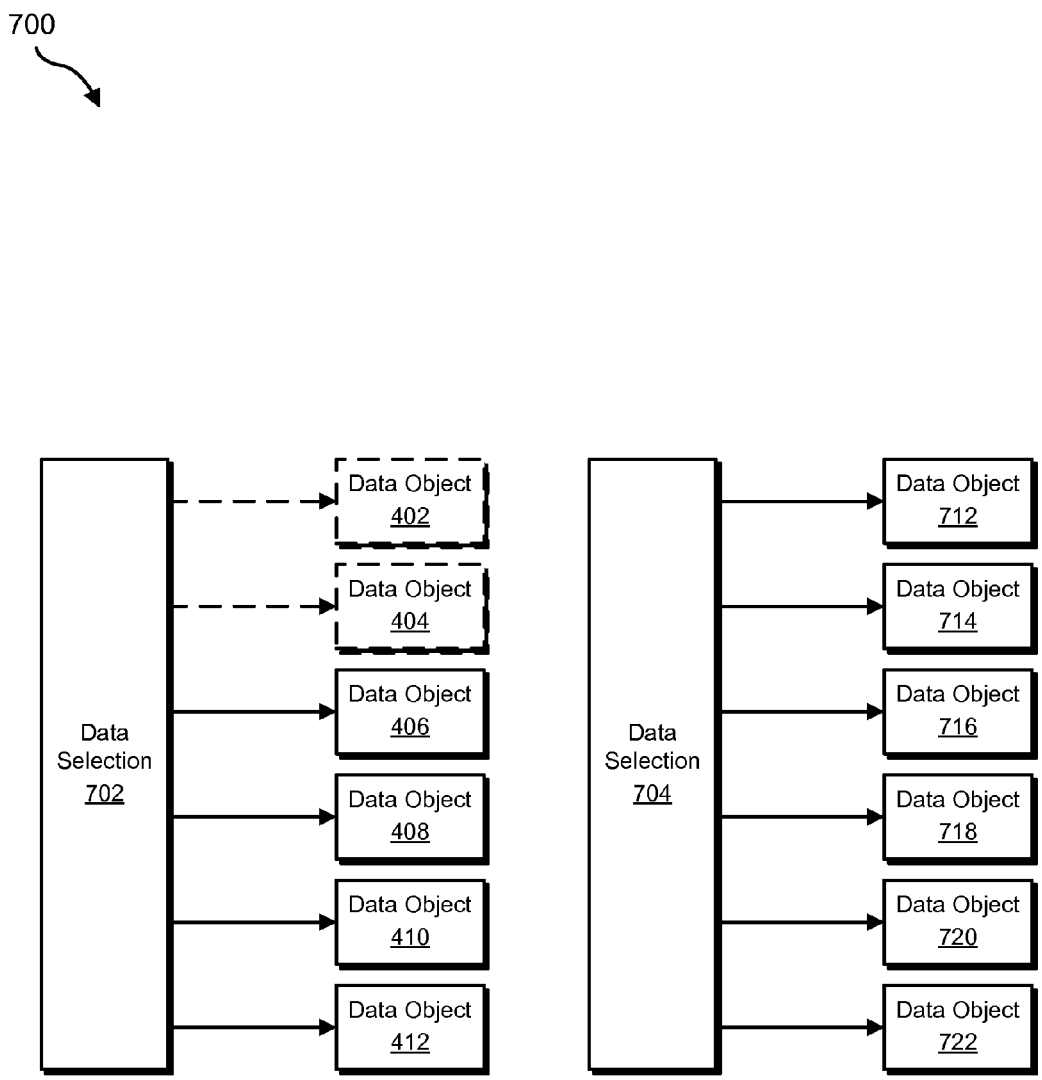
FIG. 7 is a block diagram of an exemplary deduplicated data system.

FIG. 7 illustrates an exemplary deduplicated data system 700 having two data selections: data selection 702 and data selection 704. Each data selection may include (e.g., reference) a number of data objects. For example, data selection 702 may include data objects 402-412 (e.g., from FIGS. 4-5) and data selection 704 may include data objects 712-722. As illustrated in both FIG. 5 and FIG. 7, data objects 402 and 404 may be deleted and/or in the process of deletion.

In contexts where the deduplicated data system includes data selections, targeting module 105 may create a list of data objects to check for references to the sampled data segments. For example, targeting module 105 may identify a plurality of data selections within the deduplicated data system and create a list of data objects that are referenced by at least one data selection within the plurality of data selections. These steps may be helpful or necessary when determining which data objects are in use by any data selection. For example, data object 404 in data selection 702 and data object 714 in data selection 704 may be the same data object. In this example, even though a reference to data object 404 is deleted from data selection 702, data object 404 (i.e., data object 714) must not be deleted since data selection 704 still references data object 714.

Targeting module 105 may identify data selections in any suitable manner. For example, targeting module 105 may identify a plurality of data selections by reading from a configuration file associated with the plurality of data selections. Additionally or alternatively, targeting module 105 may identify a plurality of data selections by identifying (e.g., receiving, intercepting, and/or retrieving) a message identifying the plurality of data selections.

Targeting module 105 may create a list of referenced data objects in a variety of ways. In some examples, targeting module 105 may create the list of referenced data objects by culling a list of referenced data objects from each data selection within the plurality of data selections. For example, targeting module 105 may identify both "active" data selections and "inactive" data selections. Active data selections may include each data selection from which a relatively large number of data objects have been removed since the last time the active data selection was analyzed. In contrast, inactive data selections may include all data selections that are not identified as "active" (e.g., data selections from which relatively few data objects have been removed since the last time the active data selection was analyzed).

Targeting module 105 may determine that a relatively large number of data objects have been removed from a data selection in a variety of ways. For example, targeting module 105 may determine that the number of data objects removed from an active data selection (e.g., the absolute number or proportionate number of data objects removed) exceeds a predetermined threshold. Additionally or alternatively, targeting module 105 may determine that the number of data objects removed from an active data selection exceeds the number removed from one or more other data selections. In some embodiments, targeting module 105 may be able to directly determine the exact number of data objects removed from each data selection by observing the removal of the data objects and counting the number of data objects removed (e.g., targeting module 105 may count the number of data objects removed from a relational table). In certain embodiments, targeting module 105 may also account for the size of the data objects removed (e.g., targeting module 105 may determine that a relatively large number of data objects have been removed if the cumulative size of the data objects exceeds a predetermined threshold).

Using FIG. 7 as an example, targeting module 105 may identify data selection 702 as active since two data objects (data objects 402 and 404) have been removed from data selection 702. In contrast, targeting module 105 may identify data selection 704 as inactive since no data objects have been removed from data selection 704. In this example, targeting module 105 may determine that 702 is active due to a predetermined threshold (e.g., more than 20 percent of the data objects have been removed), or due to a relative comparison (e.g., data selection 702 has a higher percentage of removed data objects than any other data selection).

In some embodiments, in the course of culling a list of referenced data objects from each data selection to create a list of referenced data objects within the deduplicated data system, targeting module 105 may treat active and inactive data selections differently. For example, targeting module 105 may analyze each active data selection to determine exactly which files in the active data selection are no longer referenced (e.g., included in a data selection). Targeting module 105 may then add only those files confirmed (e.g., marked) as referenced in the list of referenced data objects within the deduplicated data system.

In the case of inactive data selections, targeting module 105 may make simplifying assumptions, adding data objects which are most likely still referenced to the list of referenced data objects. For example, targeting module 105 may include each data object marked as referenced by the inactive data selection in the list of referenced data objects and also include each data object recently added to the inactive data selection in the list of referenced data objects. In the above examples, targeting module 105 may effectively create a list of referenced data objects that is mostly accurate (e.g., a majority data objects on the list may still be included within a data selection, although a few may no longer be).

As will be described in greater detail below, since the above-described list of referenced data objects may be used to identify data segments that are still referenced by at least one data object, including a small number of data objects that are no longer included in any data selection may make the list of referenced data objects slightly overbroad, potentially leading to marking some data segments as referenced even though the only data objects referencing them are invalid. However, by only analyzing active data selections (e.g., data selections with many data objects removed), this drawback may be minimized while saving significant amounts of time and computing resources.

Returning to step 306 of FIG. 3, as mentioned earlier targeting module 105 may, for each unreferenced data segment, identify a container that contains the unreferenced data segment. Using FIGS. 5-6 as an example, targeting module 105, having identified data segments 430 and 436 as unreferenced data segments within sample 660, may identify both data segments as belonging to container 460.

Targeting module 105 may identify a container that contains an unreferenced data segment in any suitable manner. For example, targeting module 105 may identify a fingerprint of the unreferenced data segment and query a data index of the deduplicated data system using the fingerprint to locate the container of the unreferenced data segment. As used herein, the term "fingerprint" may refer to any fingerprint, hash, checksum, and/or unique identifier of a unit of data. Using FIGS. 5-6 as an example, targeting module 105 may query index 610 with a fingerprint of unreferenced data segment 430 and receive information from index 610 indicating that data segment 430 is contained within container 460.

Returning to step 306 of FIG. 3, targeting module 105 may identify that a container has a large proportion of unreferenced data segments based on a variety of criteria. For example, targeting module 105 may identify that the container includes a proportion of unreferenced data segments that exceeds a predetermined threshold. In another example, targeting module 105 may determine that the amount of data that the unreferenced data segments represent exceeds a predetermined threshold (by determining, e.g., that the number of bytes that would be freed if the unreferenced data segments were removed exceeds a predetermined threshold). Additionally or alternatively, targeting module 105 may determine that the container includes a larger proportion of unreferenced data segments than other containers. Using FIG. 5 as an example, four out of the nine data segments within container 460 may be unreferenced after the deletion of data objects 402 and 404 (data segments 424, 430, 434, and 436). In contrast, none of the data segments within container 470 may be unreferenced. In this example, targeting module 105 may determine that container 460 has a large proportion of unreferenced data segments since the percentage of unreferenced data segments within contain 460 (in this example, 44 percent) exceeds a predetermined threshold (e.g., 25 percent), and/or because container 460 has a larger proportion of unreferenced data segments than container 470. As described earlier, targeting module 105 may merely estimate the proportion of unreferenced data segments in each container. As long as the estimation approach is reasonably accurate, targeting module 105 may correctly identify those containers that have a large proportion of unreferenced data segments.

Returning to FIG. 3, at step 308 one or more of the systems described herein may, for each identified container, search for unreferenced data segments within the identified container. For example, marking module 106 in FIG. 1 may, as part of computing system 202 in FIG. 2, search for unreferenced data segments within each of containers 226 that has been identified as likely to contain a large proportion of unreferenced data segments. According to some examples described above and illustrated in FIG. 5, targeting module 105 may have identified container 460 as likely to contain a large proportion of unreferenced data segments. In these examples, marking module 106 may search for unreferenced data segments within container 460.

Marking module 106 may search for data segments within the identified container using a variety of approaches. For example, marking module 106 may access an identified container and search through each data segment within the identified container. Additionally or alternatively, marking module 106 may search through a data structure related to an identified container that may serve as a proxy for the identified container (e.g., the data structure may include both a majority of the data segments included within the identified container and relatively few data segments that are not included within the identified container).

In some embodiments, marking module 106 may exhaustively search for unreferenced data segments within the identified container (by, e.g., checking every data segment within the container). Alternatively, marking module 106 may perform an extensive but not exhaustive search for unreferenced data segments within the identified container (by, e.g., checking a majority of data segments within the container but skipping some data segments for efficiency purposes). In various embodiments, marking module 106 may perform a more extensive search for unreferenced data segments within the identified container than for unreferenced data segments within containers not identified as likely to include many unreferenced data segments.

Marking module 106 may search for unreferenced data segments within the identified container in a variety of ways. In some examples, marking module 106 may search for unreferenced data segments within the identified container as part of a mark-and-sweep process. For example, marking module 106 may mark referenced data segments within the identified container as referenced and then identify unmarked data segments. In this example, marking module 106 may mark referenced data segments in the identified container by checking each data segment in the identified container against a list of data objects in the deduplicated data system and marking a data segment when a data object that references the data segment is found.

According to some embodiments, marking module 106 may also mark data segments within containers that are not identified as likely to include a large proportion of unreferenced data segments. Rather than extensively analyzing these containers, however, marking module 106 may simply, for each container not identified, combine old marking results for the container with information on data segments recently added to the container. For example, marking module 106 may: 1) identify a list of data segments within the container that were previously marked as referenced, 2) identify a set of data segments recently added to the container, and then 3) add the set of data segments recently added to the container to the list of marked data segments within the container. Data segments recently added to the container may include data segments added to the container since the last marking operation performed on data segments in the container.

By using old marking results and marking newly added data segments, marking module 106 may efficiently ensure that referenced data segments within containers that were not identified as likely to contain unreferenced data segments do not remain unmarked. While relatively few unreferenced data segments may become marked in this method, the computing resources saved by not extensively analyzing a container that may have a small proportion of unreferenced data segments may outweigh the marginal benefit of removing this relatively small number of unreferenced data segments.

Returning to FIG. 3, at step 310 sweeping module 108 may remove the unreferenced data segments from the identified container (e.g., from each container identified as likely to have a large proportion of unreferenced data segments). For example, sweeping module 108 may, as part of computing system 202, remove unreferenced data segments from a container within containers 226 that was identified as likely to have a large proportion of unreferenced data segments.

Sweeping module 108 may perform step 310 in any suitable manner. For example, if marking module 106 identified unreferenced data segments by marking referenced data segments, sweeping module 108 may remove unmarked data segments from the identified container.

While the foregoing descriptions and examples may refer to data objects as files and data segments as file portions, the methods and systems described herein may apply to any level of data deduplication. For example, if data selections within a deduplicated data system are grouped into "data super-selections," the methods and systems described herein may identify those data super-selections that have (or are likely to have) data selections that would benefit most from an extensive analysis and, subsequently, focus a mark-and-sweep operation on those data super-selections.

The systems and methods described herein improve the efficiency of unreferenced data segment removal in a variety of contexts. In one example, an archiving system (such as SYMANTEC's ENTERPRISE VAULT) may retain seven years worth of backup data. During those seven years, the backup data may reside on the archiving system without inspection. Performing an extensive analysis of the entire seven years' worth of backup data may consume a large amount of computing resources. By focusing the analysis, the methods and systems described herein may detect that the containers with the most reclaimable space are those that are approximately seven years old. These containers may be analyzed extensively, while the remaining containers may be analyzed less extensively using approximation techniques.

As detailed above, by focusing mark-and-sweep procedures on containers that are more likely to include a proportionally large number of unreferenced data segments, the systems and methods described herein may efficiently delete unreferenced data segments by reducing the amount of computing resources consumed per data-segment deletion. Moreover, in some cases the systems and methods described herein may also improve the analysis of data selections in the course of mark-and-sweep procedures by only fully analyzing data selections that have had a large number of data objects removed.

Figure 8:
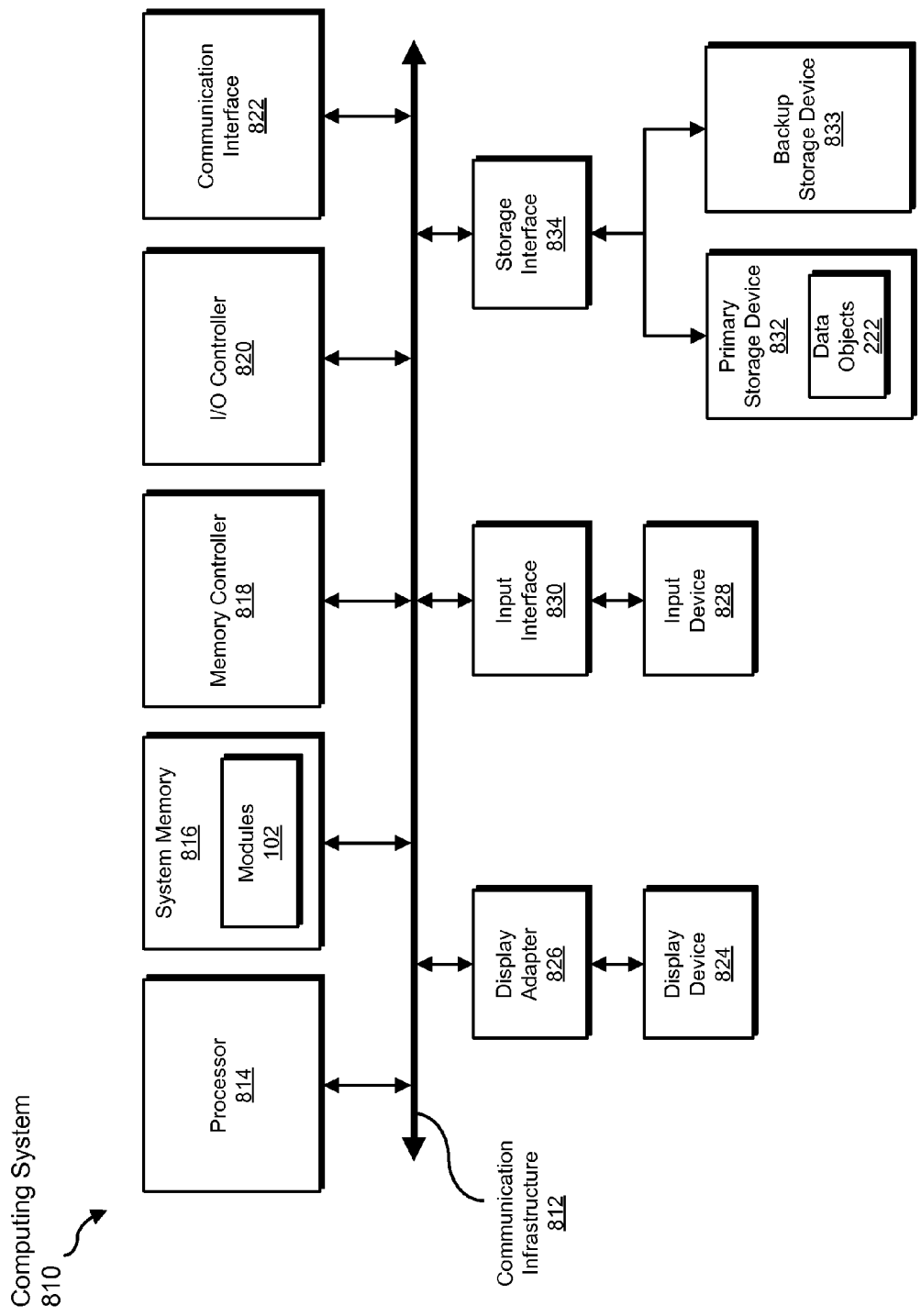
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of processing unit capable of processing data or interpreting and executing instructions. In certain embodiments, processor 814 may receive instructions from a software application or module. These instructions may cause processor 814 to perform the functions of one or more of the exemplary embodiments described and/or illustrated herein. For example, processor 814 may perform and/or be a means for performing, either alone or in combination with other elements, one or more of the identifying, selecting, creating, analyzing, including, querying, searching, marking, adding, and/or removing steps described herein. Processor 814 may also perform and/or be a means for performing any other steps, methods, or processes described and/or illustrated herein.

System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an ISA, PCI, PCIe, or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812. In certain embodiments, memory controller 818 may perform and/or be a means for performing, either alone or in combination with other elements, one or more of the steps or features described and/or illustrated herein, such as identifying, selecting, creating, analyzing, including, querying, searching, marking, adding, and/or removing.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834. I/O controller 820 may be used, for example, to perform and/or be a means for performing, either alone or in combination with other elements, one or more of the identifying, selecting, creating, analyzing, including, querying, searching, marking, adding, and/or removing steps described herein. I/O controller 820 may also be used to perform and/or be a means for performing other steps and features set forth in the instant disclosure.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution. In certain embodiments, communication interface 822 may perform and/or be a means for performing, either alone or in combination with other elements, one or more of the identifying, selecting, creating, analyzing, including, querying, searching, marking, adding, and/or removing steps disclosed herein. Communication interface 822 may also be used to perform and/or be a means for performing other steps and features set forth in the instant disclosure.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device. In at least one embodiment, input device 828 may perform and/or be a means for performing, either alone or in combination with other elements, one or more of the identifying, selecting, creating, analyzing, including, querying, searching, marking, adding, and/or removing steps disclosed herein. Input device 828 may also be used to perform and/or be a means for performing other steps and features set forth in the instant disclosure.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a floppy disk drive, a magnetic tape drive, an optical disk drive, a flash drive, or the like. Storage interface 834 generally represents any type or form of interface or device for transferring data between storage devices 832 and 833 and other components of computing system 810. In one example, data objects 222 from FIG. 2 may be stored in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

In certain embodiments, storage devices 832 and 833 may be used, for example, to perform and/or be a means for performing, either alone or in combination with other elements, one or more of the identifying, selecting, creating, analyzing, including, querying, searching, marking, adding, and/or removing steps disclosed herein. Storage devices 832 and 833 may also be used to perform and/or be a means for performing other steps and features set forth in the instant disclosure.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an application specific integrated circuit (ASIC) adapted to implement one or more of the exemplary embodiments disclosed herein.

Figure 9:
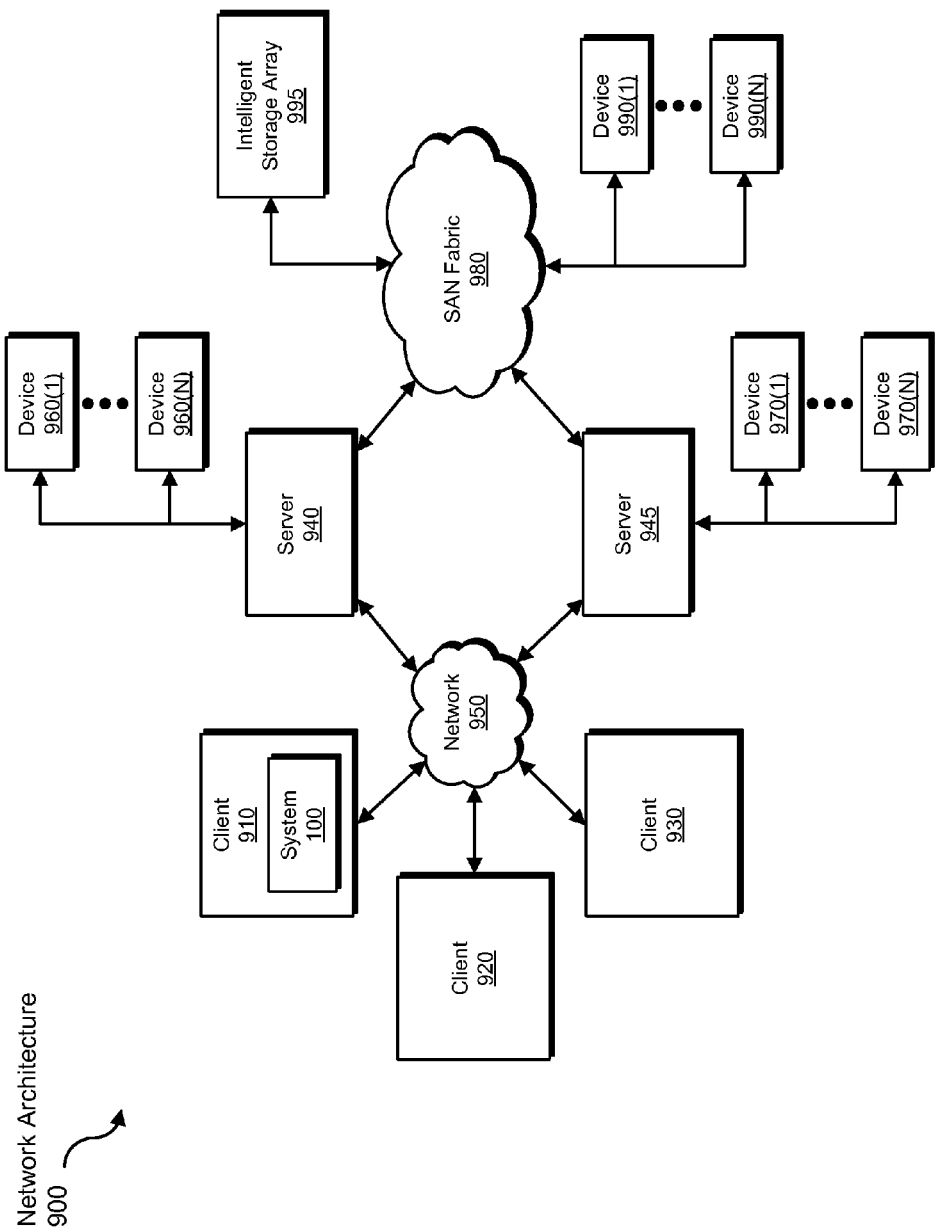
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. Client systems 910, 920, and 930 generally represent any type or form of computing device or system, such as exemplary computing system 810 in FIG. 8. In one example, client system 910 may include system 100 from FIG. 1.

Similarly, servers 940 and 945 generally represent computing devices or systems, such as application servers or database servers, configured to provide various database services and/or run certain software applications. Network 950 generally represents any telecommunication or computer network including, for example, an intranet, a wide area network (WAN), a local area network (LAN), a personal area network (PAN), or the Internet.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent network-attached storage (NAS) devices configured to communicate with servers 940 and 945 using various protocols, such as NFS, SMB, or CIFS.

Servers 940 and 945 may also be connected to a storage area network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950. Accordingly, network architecture 900 may perform and/or be a means for performing, either alone or in combination with other elements, one or more of the identifying, selecting, creating, analyzing, including, querying, searching, marking, adding, and/or removing steps disclosed herein. Network architecture 900 may also be used to perform and/or be a means for performing other steps and features set forth in the instant disclosure.

As detailed above, computing system 810 and/or one or more components of network architecture 900 may perform and/or be a means for performing, either alone or in combination with other elements, one or more steps of an exemplary method for removing unreferenced data segments from deduplicated data systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a deduplicated data system into an efficient deduplicated data system by reducing the amount of computing resources necessary to remove unreferenced data segments from the deduplicated data system. In another example, one or more of the modules described herein may transform a deduplicated data system by removing unreferenced data segments from the deduplicated data system.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for removing unreferenced data segments from deduplicated data systems, the method comprising:

identifying a deduplicated data system that contains a plurality of data segments, wherein the deduplicated data system reduces redundant data by only storing a single instance of each of the plurality of data segments;

identifying a plurality of containers within the deduplicated data system, each container comprising a subset of the plurality of data segments within the deduplicated data system;

identifying at least one container within the plurality of containers that includes a proportion of unreferenced data segments that exceeds a predetermined threshold, wherein the unreferenced data segments represent data segments that are not referenced by data objects within the deduplicated data system;

for each identified container:
  searching for unreferenced data segments within the identified container;

removing the unreferenced data segments from the identified container;
wherein the computer-implemented method is performed by a computing device comprising at least one processor.

2. The computer-implemented method of claim 1, wherein the subset of the plurality of data segments contained within each of the plurality of containers includes data segments that are interrelated.

3. The computer-implemented method of claim 1, wherein identifying at least one container within the plurality of containers that includes a proportion of unreferenced data segments that exceeds a predetermined threshold comprises:
identifying a sample of data segments within the plurality of data segments;
identifying data segments within the sample of data segments that are not referenced by data objects within the deduplicated data system;
for each unreferenced data segment, identifying a container that contains the unreferenced data segment.

4. The computer-implemented method of claim 3, wherein identifying the sample of data segments comprises randomly selecting the sample of data segments.

5. The computer-implemented method of claim 3, wherein identifying the container that contains the unreferenced data segment comprises:
identifying a fingerprint of the unreferenced data segment;
querying a data index of the deduplicated data system using the fingerprint to locate the container of the unreferenced data segment.

6. The computer-implemented method of claim 3, wherein identifying the sample of data segments comprises selecting the sample of data segments from an index of data segments within the deduplicated data system.

7. The computer-implemented method of claim 3, wherein identifying the data segments within the sample of data segments that are not referenced by data objects within the deduplicated data system comprises:
identifying a plurality of data selections within the deduplicated data system;
creating a list of data objects that are referenced by at least one data selection within the plurality of data selections.

8. The computer-implemented method of claim 7, wherein creating the list of referenced data objects comprises:
identifying at least one active data selection in the plurality of data selections that has had a relatively large number of data objects removed since the last time the active data selection was analyzed;
analyzing the active data selection to identify each data object referenced by the active data selection;
including each data object referenced by the active data selection in the list of referenced data objects.

9. The computer-implemented method of claim 7, wherein creating the list of referenced data objects comprises:
identifying at least one inactive data selection in the plurality of data selections that has had relatively few data objects removed since the last time the inactive data selection was analyzed;
including each data object marked as referenced by the inactive data selection in the list of referenced data objects;
including each data object recently added to the inactive data selection in the list of referenced data objects.

10. The computer-implemented method of claim 1, wherein searching for unreferenced data segments within the identified container comprises exhaustively searching for unreferenced data segments within the identified container.

11. The computer-implemented method of claim 1, wherein searching for unreferenced data segments within the identified container comprises:
marking referenced data segments within the identified container as referenced;
identifying unmarked data segments.

12. The computer-implemented method of claim 1, further comprising, for each container not identified as including a proportion of unreferenced data segments that exceeds a predetermined threshold:
identifying a list of data segments in the container previously marked as referenced;
identifying a set of data segments recently added to the container;
adding the set of data segments recently added to the container to the list of marked data segments in the container.

13. The computer-implemented method of claim 1, wherein identifying at least one container within the plurality of containers that includes a proportion of unreferenced data segments that exceeds a predetermined threshold comprises at least one of:
identifying at least one container within the plurality of containers that includes an amount of data consumed by unreferenced data segments that exceeds a predetermined threshold;
identifying at least one container within the plurality of containers that includes a larger proportion of unreferenced data segments than at least one other container.

14. A system for removing unreferenced data segments from deduplicated data systems, the system comprising:
an identification module programmed to:
identify a deduplicated data system that contains a plurality of data segments, wherein the deduplicated data system reduces redundant data by only storing a single instance of each of the plurality of data segments;
identify a plurality of containers within the deduplicated data system, each container comprising a subset of the plurality of data segments within the deduplicated data system;
a targeting module programmed to identify at least one container within the plurality of containers that includes a proportion of unreferenced data segments that exceeds a predetermined threshold, wherein the unreferenced data segments represent data segments that are not referenced by data objects within the deduplicated data system;
a marking module programmed to, for each identified container, search for unreferenced data segments within the identified container;
a sweeping module programmed to, for each identified container, remove the unreferenced data segments from the identified container;
at least one processor configured to execute the identification module, the targeting module, the marking module, and the sweeping module.

15. The system of claim 14, wherein the subset of the plurality of data segments contained within each of the plurality of containers includes data segments that are interrelated.

16. The system of claim 14, wherein the targeting module is programmed to identify at least one container within the plurality of containers that includes a proportion of unreferenced data segments that exceeds a predetermined threshold by:

identifying a sample of data segments within the plurality of data segments;

identifying data segments within the sample of data segments that are not referenced by data objects within the deduplicated data system;

for each unreferenced data segment, identifying a container that contains the unreferenced data segment.

17. The system of claim 16, wherein the targeting module is programmed to identify the sample of data segments by randomly selecting the sample of data segments.

18. The system of claim 16, wherein the targeting module is programmed to identify the container that contains the unreferenced data segment by:

identifying a fingerprint of the unreferenced data segment;

querying a data index of the deduplicated data system using the fingerprint to locate the container of the unreferenced data segment.

19. The system of claim 14, wherein the targeting module is programmed to identify at least one container within the plurality of containers that includes a proportion of unreferenced data segments that exceeds a predetermined threshold by at least one of:

identifying at least one container within the plurality of containers that includes an amount of data consumed by unreferenced data segments that exceeds a predetermined threshold;

identifying at least one container within the plurality of containers that includes a larger proportion of unreferenced data segments than at least one other container.

20. A computer-readable-storage medium comprising one or more computer-executable instructions that, when executed by at least one processor of a computing device, cause the computing device to:

identify a deduplicated data system that contains a plurality of data segments, wherein the deduplicated data system reduces redundant data by only storing a single instance of each of the plurality of data segments;

identify a plurality of containers within the deduplicated data system, each container comprising a subset of the plurality of data segments within the deduplicated data system;

identify at least one container within the plurality of containers that includes a proportion of unreferenced data segments that exceeds a predetermined threshold, wherein the unreferenced data segments represent data segments that are not referenced by data objects within the deduplicated data system;

for each identified container:

search for unreferenced data segments within the identified container;

remove the unreferenced data segments from the identified container.

\* \* \* \* \*